United States Patent
Burgardt et al.

(10) Patent No.: US 9,242,623 B2
(45) Date of Patent: Jan. 26, 2016

(54) PARKING-LOCK ARRANGEMENT AND MOTOR VEHICLE TRANSMISSION

(71) Applicant: GETRAG Getriebe- und Zahnradfabrik Hermann Hagenmeyer GmbH & Cie KG, Untergruppenbach (DE)

(72) Inventors: Georg Burgardt, Bretzfeld (DE); Stefan Kapp, Walheim (DE)

(73) Assignee: GETRAG GETRIEBE- UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 0 days.

(21) Appl. No.: 13/855,578

(22) Filed: Apr. 2, 2013

(65) Prior Publication Data
US 2013/0256089 A1   Oct. 3, 2013

(30) Foreign Application Priority Data
Apr. 2, 2012 (DE) .................. 10 2012 007 061

(51) Int. Cl.
*B60T 1/00* (2006.01)
*F16H 63/34* (2006.01)

(52) U.S. Cl.
CPC ............ *B60T 1/005* (2013.01); *F16H 63/3416* (2013.01); *F16H 63/3433* (2013.01)

(58) Field of Classification Search
CPC .................................................. F16H 63/3433
USPC .......................................... 192/219.4, 219.5
See application file for complete search history.

(56) References Cited

U.S. PATENT DOCUMENTS

| | | | | |
|---|---|---|---|---|
| 3,703,941 A | * | 11/1972 | Ohie et al. .................... 188/31 |
| 4,157,745 A | * | 6/1979 | Nelson ........................ 188/31 |
| 6,125,983 A | * | 10/2000 | Reed et al. ................ 192/219.5 |
| 6,725,962 B1 | | 4/2004 | Fukuda | |
| 7,753,187 B2 | * | 7/2010 | Fujimoto et al. .......... 192/219.5 |

(Continued)

FOREIGN PATENT DOCUMENTS

| CN | 1537744 A | 10/2004 |
|---|---|---|
| CN | 101611248 A | 12/2009 |

(Continued)

OTHER PUBLICATIONS

European Search Report; Application No. EP 13161266.5; Sep. 13, 2013.

(Continued)

*Primary Examiner* — Ramya Burgess
*Assistant Examiner* — Mark Manley
(74) *Attorney, Agent, or Firm* — Knobbe Martens Olson & Bear LLP (57) ABSTRACT

Parking-lock arrangement for a motor-vehicle transmission. The parking-lock arrangement has a parking-lock wheel which is mounted such that it can be rotated about a first axis. The parking-lock arrangement has a parking-lock pawl which is mounted such that it can be moved between a locking position and a release position. The parking-lock arrangement has an actuating arrangement which actuates the parking-lock pawl and is mounted such that it can be rotated about a second axis over an angular range. The angular range has a first angular section, within which the parking-lock pawl can be actuated, and a second angular section, within which the parking-lock pawl is held in a position.

10 Claims, 3 Drawing Sheets

(56) References Cited

U.S. PATENT DOCUMENTS

| | | | |
|---|---|---|---|
| 7,757,576 B1 | 7/2010 | Einboeck | |
| 2004/0261559 A1* | 12/2004 | Ozaki et al. | 74/473.12 |
| 2009/0173594 A1* | 7/2009 | Joshi et al. | 192/219.5 |
| 2009/0193931 A1 | 8/2009 | Burgardt et al. | |
| 2010/0108460 A1* | 5/2010 | Nakamura et al. | 192/219.5 |
| 2013/0134010 A1* | 5/2013 | Kimura et al. | 192/219.5 |

FOREIGN PATENT DOCUMENTS

| | | |
|---|---|---|
| CN | 101793319 A | 8/2010 |
| CN | 101480940 B | 9/2011 |
| DE | PS 1 189 866 | 12/1956 |
| DE | 21 01 822 A | 7/1971 |
| DE | 100 45 953 B4 | 9/2000 |
| DE | 10 2005 022 926 B3 | 5/2005 |
| DE | 10 2005 029 966 A1 | 6/2005 |
| DE | 20 2008 001 760 U1 | 2/2008 |
| DE | 10 2010 027826 A1 | 10/2011 |
| EP | 0 895 908 A1 | 2/1999 |
| EP | 1 865 237 A1 | 6/2006 |
| EP | 2 275 719 A1 | 1/2011 |
| EP | 2 469 130 A1 | 6/2012 |
| GB | 2 467 378 A | 8/2010 |
| WO | WO2011/141947 * | 11/2011 |

OTHER PUBLICATIONS

Office Action in related Chinese Application No. 201310112128.2, dated Jan. 26, 2015 in 18 pages.

* cited by examiner

PARKING-LOCK ARRANGEMENT AND MOTOR VEHICLE TRANSMISSION

CROSS-REFERENCE TO RELATED APPLICATIONS

This application claims the priority of German patent application DE 10 2012 007 061.6 filed Apr. 2, 2012.

BACKGROUND OF THE INVENTION

The present invention relates to a parking-lock arrangement for a motor-vehicle transmission, having a parking-lock pawl which is mounted such that it can be moved between a locking position and a release position and having an actuating arrangement which actuates the parking-lock pawl and is mounted such that it can be rotated about a second axis over an angular range.

Furthermore, the present invention relates to a motor-vehicle transmission having a parking-lock arrangement of this type.

A parking-lock arrangement of the abovementioned type is known from document DE 20 2008 001 760 U1. Here, the parking-lock pawl is mounted such that it can be pivoted about a further axis between a locking position and a release position.

Here, the actuating arrangement comprises a guide device which is arranged on an actuating shaft and which has a guide section which is configured eccentrically with respect to the actuating shaft. Furthermore, a cam is provided on the actuating shaft, by means of which cam the locking pawl can be held in the locking position. The actuating shaft is configured such that it can be rotated to a limited extent by means of an actuator or a parking-lock shifting mechanism.

Document DE 10 2005 022 926 B3 has disclosed a two-gear transmission for an electric drive, in which two-gear transmission the two gears can be engaged and disengaged by means of a gear-shifting drum. Furthermore, a parking-lock driver engages into a groove of the gear-shifting drum, by means of which parking-lock driver a parking-lock arrangement can be actuated which is configured in the manner of a clutch.

A parking-lock arrangement which is driven by electric motor with a complicated lever linkage is known from document EP 0 895 908 A1.

Further parking-lock arrangements are known from documents DE 100 45 953 B4 and DE 10 2005 029 966 A1.

Finally, DE-PS 1 189 866 has disclosed achieving blocking of a transmission by virtue of the fact that two gear stages of a countershaft transmission are engaged at the same time. Here, the engagement and disengagement of the gear stages takes place via a step-by-step shifting mechanism which has a slotted-guide disc, in which slots are formed for guiding selector forks.

SUMMARY OF THE INVENTION

Against this background, it is an object of the invention to specify an improved parking-lock arrangement which can be realized, in particular, with low complexity and/or inexpensively with great robustness.

The above object is achieved in the parking-lock arrangement which was mentioned at the outset by virtue of the fact that the angular range has a first angular section, within which the parking-lock pawl can be actuated, and a second angular section, within which the parking-lock pawl is held in a position.

Furthermore, the above object is achieved by a motor-vehicle transmission having a shifting arrangement which can be actuated by means of at least one gear-shifting drum, and having a parking-lock arrangement of the type according to the invention, the gear-shifting drum being coupled to the parking-lock arrangement.

As a result of the measure of designing the actuating arrangement in such a way that it can be rotated over a great angular range which comprises not only a first angular section for actuating the parking-lock pawl but also a further angular range, within which the parking-lock pawl is held in a position, the parking-lock arrangement can also be actuated by drive elements of the type which are provided per se for other purposes in the motor-vehicle transmission, such as a gear-shifting drum or the like. Accordingly, the parking-lock arrangement can be driven by way of a drive element which is present in any case in the transmission, with the result that the parking-lock arrangement can be realized inexpensively and with low complexity and/or a low number of components. In addition, the space requirement of the parking-lock arrangement can be reduced as a result.

A parking-lock arrangement of this type can, however, depending on the vehicle transmission type, also be driven by means of a dedicated drive, for example an electric motor. The parking-lock arrangement is therefore generally suitable for being used in different types of vehicle transmissions. As a result, the cost structure can be improved, since many components can possibly be produced in higher numbers.

The object is therefore achieved completely.

It is particularly preferred if the first axis and the second axis are oriented parallel to one another. Furthermore, it is preferred if the second angular section is greater than 180°, in particular greater than 250°. Furthermore, it is preferred if the second angular section is smaller than 360°, in particular smaller than 330°.

The actuating arrangement is preferably configured in the manner of a wheel arrangement which is mounted such that it can be rotated about the second axis. The parking-lock pawl is preferably mounted such that it can be pivoted about a third axis between the locking position and a release position.

According to one particularly preferred embodiment, the parking-lock pawl is held in the release position within the second angular section.

In this embodiment, the actuating arrangement also consequently serves as a locking means of the parking-lock arrangement in the release position, with the result that separate elements for locking are not necessary.

According to a further preferred embodiment, the second angular section is greater than the first angular section. As a result, a comparatively great second angular section can be provided which is reserved for tasks of a drive of the parking-lock arrangement which do not serve for actuation of the parking-lock arrangement (such as the shifting of gear stages of a transmission).

Furthermore, it is advantageous if the actuating arrangement has a guide section which is arranged around the second axis and in which a driver is guided which is connected to the parking-lock pawl.

Here, the driver is preferably moved or can be moved in the region of the first angular section in such a way that the locking position of the parking-lock pawl can be adjusted. Insofar as the driver is moved in the guide section within the second angular section, the position of the parking-lock pawl is kept by the guide section, in particular in the release position.

Here, it is of particular advantage if the parking-lock pawl can be moved by means of the guide section from the locking position into the release position.

In this embodiment, it is possible to lock the parking-lock pawl within the second angular section by means of the guide section. Furthermore, the reverse movement of the parking-lock pawl into the locking position can be realized by means of another element.

Here, it is particularly preferred if the actuating arrangement has an actuating cam, by means of which the parking-lock pawl can be moved from the release position into the locking position.

Here, the actuating cam and the guide section can preferably be connected to one another rigidly, but can also possibly be configured such that they can be moved relative to one another.

In particular when the first axis and the second axis are arranged parallel to one another, the guide section is preferably configured as a groove or as a radial shoulder on an actuating wheel, preferably on an axial end side of the actuating wheel.

According to one preferred embodiment, the actuating arrangement has a carrier wheel and an actuating wheel, the carrier wheel being driven, and the guide section and/or the actuating cam being formed on the actuating wheel.

The carrier wheel and the actuating wheel can be configured in one piece with one another.

It is particularly preferred, however, if the actuating wheel is arranged coaxially with respect to the carrier wheel and is coupled to the carrier wheel at least in one rotational direction via a torsion spring.

In this embodiment, it is possible within the first angular section to prestress the parking-lock arrangement by means of the torsion spring into the locking position, even if the locking pawl lies on a tooth of the parking-lock wheel. As soon as the parking-lock wheel rotates further, the parking-lock pawl passes into a recess of the parking-lock wheel, to be precise on account of the prestressing force of the torsion spring, with the result that reliable engagement of the locking position is made possible.

The carrier wheel and/or the actuating wheel can be configured as wheels which extend over 360°. However, it is also possible in general to configure the actuating wheel and/or the carrier wheel as wheel segments which extend over an angular range of less than 360°, but preferably greater than 120°, in particular greater than 180°.

According to a further embodiment which is preferred overall, the actuating arrangement is driven by means of an electric motor, the drive shaft of which is oriented parallel to the second axis.

This embodiment represents a separate invention, independently of whether the angular range is divided into a first angular section and a second angular section.

This measure achieves a situation where an actuation of the parking-lock arrangement can be realized substantially without rotation/translation converters. Here, the rotational movement of the drive shaft of the electric motor can be converted directly into a rotational movement of an actuating wheel of the parking-lock arrangement, without complicated lever mechanisms or the like having to be provided.

In this embodiment, it is of particular advantage if the drive shaft of the electric motor is connected to a gear-shifting drum for actuating at least one shifting element, the actuating arrangement preferably being connected to the gear-shifting drum.

It is possible in general that the drive shaft is connected via a dedicated output means to the parking-lock arrangement or its actuating arrangement. It is of particular advantage, however, if the gear-shifting drum is connected to the actuating arrangement. For this purpose, a suitable toothing system or another drive means can be provided on the gear-shifting drum, such as a toothed belt pulley, a chain sprocket or the like.

Furthermore, it is generally possible that the gear-shifting drum is connected directly to the actuating arrangement here, that is to say, for example, by way of a tooth engagement between a toothing system of the gear-shifting drum and a toothing system of the actuating arrangement.

It is particularly preferred, however, if the actuating arrangement is connected to the gear-shifting drum via a wheel-set arrangement.

High transmission ratios can be set as a result, so that the parking-lock arrangement can be actuated with very low torques of the electric motor.

Overall, a series of advantages can be achieved by way of the parking-lock arrangement according to the invention and the motor-vehicle transmission which is equipped with the said parking-lock arrangement, which advantages are listed in the following text and, depending on the embodiment, can be realized individually or in combination with one another.

Firstly, an integrated, electromechanically actuated parking-lock arrangement can be realized which can be actuated in accordance with the "park by wire" type and/or can be actuated mechanically (for example, by means of a selector lever). An electromechanical transmission actuating system which is already present can preferably be used, such as a gear-shifting drum. This results in high integrity, low costs, low complexity and a high degree of robustness.

The connection of the drive shaft to the actuating arrangement preferably takes place via a spur gear drive, a chain drive, a toothed belt drive or the like. A rotational movement of the gear-shifting drum preferably leads necessarily to a rotational movement of the actuating arrangement. In an angular range of the gear-shifting drum, which angular range is provided for the actuation of shifting elements (second angular section), the actuating arrangement rotates freely, without a function, that is to say without actuating the parking-lock arrangement. Here, the parking-lock arrangement is preferably held or locked, however, in a position, in particular the release position.

The parking-lock arrangement can be moved into the locking position within the first angular section. It is possible here that a gear which is assigned to the gear-shifting drum remains engaged or else is disengaged. If a gear is engaged, this is preferably a low gear, such as a reverse gear or a first gear stage.

In particular, if the actuation takes place via a wheel-set arrangement, the result is high safety reserves with regard to the required actuating forces. In particular, in the case of a parallel orientation of the different axes, the result is a high degree of mechanical efficiency, since the actuation can be realized by toothing systems or the like. Furthermore, no conversions of rotational energy into translational energy or vice versa are necessary in this embodiment. As a result of the wheel-set arrangement, it is preferably possible, furthermore, to adapt the rotational range of the gear-shifting drum for actuating shifting elements to the second angular section.

Since the parking-lock arrangement is coupled to the gear-shifting drum in one variant, the actuating software for actuating the parking disc can automatically meet a safety-related classification which has to first of all be tested in a complex manner by separate programming in other applications.

If the actuating arrangement is connected to the gear-shifting drum, a combination with classic parking locks ("bullet design") is also possible, in particular via corresponding deflecting mechanisms.

No separate sensor is necessary for detecting a rotational position of the actuating arrangement of the parking-lock arrangement, since a rotational angle transducer (for example, an incremental sensor) can be used which is assigned to the gear-shifting drum in any case.

A latching means or locking means of the parking-lock arrangement in the release position does not have to be provided separately. This is preferably realized by the guide section within the second angular section.

If the shifting elements which are actuated by means of the gear-shifting drum have synchronizing units, it is preferred if they have at least partially a pointed clutch-body toothing system or a great cone angle or a decoupled clutch body, to be precise, in particular, with regard to that gear which is arranged immediately adjacently to the first angular section. As a result, the availability of the gear with regard to the engagement can be improved.

Finally, an additional mechanical attachment to the actuating arrangement is possible, in order to realize an emergency unlocking means, for example.

It goes without saying that the features mentioned in the above text and those still to be explained in the following text can be used not only in the respectively specified combination, but rather also in other combinations or on their own, without departing from the scope of the present invention.

BRIEF DESCRIPTION OF THE DRAWINGS

Exemplary embodiments of the invention are shown in the drawing and will be explained in greater detail in the following description. In the drawing.

DETAILED DESCRIPTION OF THE PREFERRED EMBODIMENT

Figure 1:
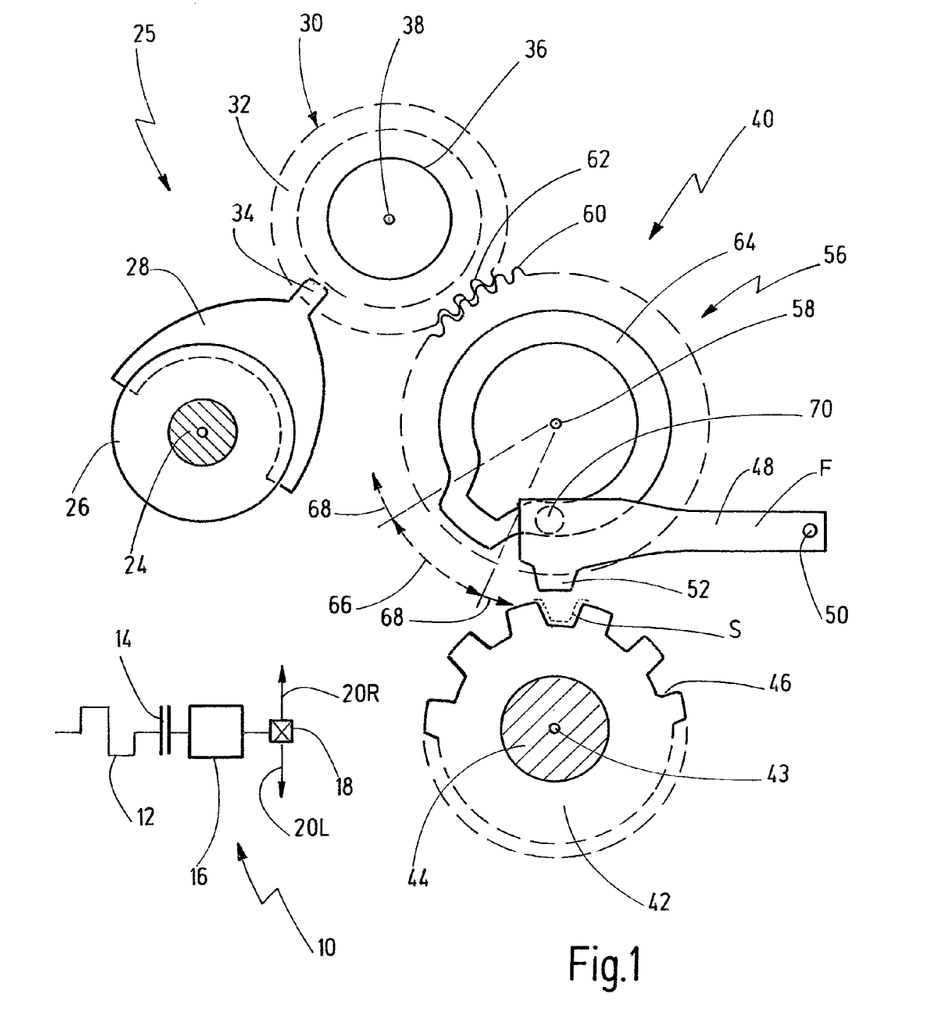
FIG. 1 shows a diagrammatic cross-sectional view of part of a motor-vehicle transmission according to the invention with a parking-lock arrangement according to the invention according to one embodiment of the invention.

FIG. 1 diagrammatically shows a drive train for a motor vehicle, which drive train is denoted generally by 10. The drive train 10 comprises a drive engine 12 such as an internal combustion engine and a clutch arrangement 14. The output of the clutch arrangement 14 is connected to a motor-vehicle transmission 16. An output of the motor-vehicle transmission 16 is connected to a differential 18 which distributes drive power to two driven wheels 20L, 20R of the motor vehicle.

The motor-vehicle transmission 16 can be a manual change-speed transmission, an automated change-speed transmission, a dual-clutch transmission or an automatic-converter transmission, or else a continuously variable transmission.

In the present case, the motor-vehicle transmission 16 is configured as a multi-step transmission with a plurality of gear stages, for example with six, seven or more forward gear stages and at least one reverse gear stage. The gear stages of the motor-vehicle transmission 16 can be engaged and disengaged by means of a shifting arrangement 25 which is indicated diagrammatically in FIG. 1. Here, at least one selector sleeve 26 of the shifting arrangement 25 is mounted axially displaceably on a first transmission shaft 24. The selector sleeve 26 is coupled to a shifting member 28 such as a selector fork. Furthermore, the shifting arrangement 25 comprises a gear-shifting drum 30 which has a diagrammatically indicated shifting groove 32. A shifting-member driver 34 of the shifting member 28 is guided in the shifting groove 32. The gear-shifting drum 30 can be driven by means of an electric motor 36 which has a drive shaft 38. In the present case, the electric motor 36 is arranged coaxially with respect to the gear-shifting drum 30, but can also be coupled to the gear-shifting drum 30 via a wheel set or the like. The drive shaft 38 is preferably oriented parallel to the first transmission shaft 24.

The gear-shifting drum 30 can be rotated by actuation of the electric motor 36, as a result of which the shifting-member driver 34 is moved in the axial direction (perpendicularly with respect to the plane of the drawing), in order to engage and disengage one or two gear stages. It goes without saying that the motor-vehicle transmission 16 preferably comprises a plurality of shifting members of this type, of which one or more can be actuated by means of a gear-shifting drum 30. Furthermore, the motor-vehicle transmission can have two gear-shifting drums 30 which are assigned in each case to different gears. In the case of a dual clutch transmission, for example, one gear-shifting drum can be assigned to even gear stages and the other gear-shifting drum can be assigned to odd forward gear stages.

Furthermore, the motor-vehicle transmission 16 comprises a parking-lock arrangement 40. The parking-lock arrangement 40 has a parking-lock wheel 42 which is mounted such that it can be rotated about a first axis 43. The first axis 43 is preferably oriented parallel to the drive shaft 38. The parking-lock wheel 42 is connected rigidly to a second transmission shaft 44 (or to the first transmission shaft 24), the said transmission shaft preferably being a shaft which is connected directly to the output of the motor-vehicle transmission 16, with the result that locking of the parking-lock wheel 42 results directly in blocking of the driven wheels 20L, 20R.

The parking-lock wheel 42 is provided with an external toothing system 46 on its outer circumference. Furthermore, the parking-lock arrangement 40 comprises a parking-lock pawl 48 which is mounted such that it can be pivoted around a pawl axis 50. The pawl axis 50 is preferably oriented parallel to the first axis 43 and/or preferably parallel to the drive shaft 38. A locking tooth 52 is formed on the pawl axis 50, which locking tooth 52 engages into a tooth gap of the external toothing system 46 in a locking position S (indicated by dashed lines) of the parking-lock arrangement 40. In the release position F which is shown using solid lines, the parking-lock pawl 48 is pivoted out of the engagement region of the external toothing system 46, with the result that the locking tooth 52 does not engage into the external toothing system 46.

An actuating arrangement 56 is provided in order to actuate the parking-lock pawl 48. In the present case, the actuating arrangement 56 is configured in the manner of an actuating wheel which is mounted such that it can be rotated around a second axis 58. On its outer circumference, the actuating wheel has an external toothing system 60 which is in engagement with a gear-shifting drum toothing system 62 of the gear-shifting drum 30. The gear-shifting drum toothing system 62 can be provided, for example, adjacently to the shifting groove 32 in the axial direction. As a consequence, the actuating arrangement 56 is rotationally coupled positively to the gear-shifting drum 30 in such a way that a rotational movement of the gear-shifting drum 30 always results in a rotational movement of the actuating wheel of the actuating arrangement 56. Instead of a toothing engagement, this direct connection can also be effected via a chain, a toothed belt or the like.

A guide section 64 which extends around the second axis 58 is formed on the actuating wheel of the actuating arrangement 56. The said guide section 64 can be formed, for example, by a groove which is provided in an axial end side of the actuating wheel. In the present case, the guide section 64 extends over 360°, but can also extend about a smaller angular range. The said angular range defines the extent of the rotatability of the actuating wheel. In the present case, the angular range is divided into a first angular section 66 and a second angular section 68, the sum of the angular sections being 360° in the present case. However, the sum of the angular sections 66, 68 can also be smaller than 360°, but is preferably greater than 180°, in particular greater than 275°.

The first angular section 66 is assigned to the actuation of the parking-lock arrangement 40. The second angular section 68 is assigned to the actuation of gear stages of the gear-shifting drum 30. The parking-lock pawl 48 is held in a position within the second angular section 68. In the present case, this is the release position F, as shown. The parking-lock pawl 48 has a driver 70 which extends in the axial direction and engages into the guide section 64. In the case of movements within the second angular section 68, the parking-lock pawl 48 is held as a result in the release position F, with the result that a locking means is not necessary. As a result, the gear-shifting drum 30 can be rotated within the second angular section, without the parking-lock arrangement passing into the locking position. In the case of a rotational movement of the actuating wheel of the actuating arrangement 56, in which the driver 70 passes from the second angular section 68 into the first angular section 66, the driver 70 is pressed away radially from the second axis 58 to the outside by a cam (not denoted in greater detail) on the inner circumference of the guide section 64, with the result that the parking-lock pawl 48 is moved from the release position F into the locking position S. In the case of a transition of the driver 70 from the first angular section 66 into the second angular section 68, the driver is pulled radially to the inside by an outer circumferential section of the guide section 64, with the result that the parking-lock pawl 48 passes from the locking position S back into the release position F again.

The driver 70 can be connected rigidly to the parking-lock pawl 48, but can also be coupled via a spring arrangement to the parking-lock pawl 48 in such a way that a movement of the driver 70 into the first angular section 66 is also possible when the locking tooth 52 lies above a tooth of the external toothing system 46. Only upon a further rotation of the parking-lock wheel 42 would the parking-lock pawl 48 then be pressed via the said spring arrangement in the direction towards the parking-lock wheel 42, in order to set the locking position S.

Furthermore, a locking function for locking or self-locking fixing of the parking-lock pawl 48 in the locking position S can be configured in the parking-lock arrangement 40.

In the present case, an actuating element which is present in any case in the motor-vehicle transmission 16, namely the electric motor 36 for actuating the gear-shifting drum 30, is used for actuating the parking-lock arrangement 40. Here, the output shaft 38 of the electric motor 36 and/or the gear-shifting drum 30 are/is coupled positively to the actuating arrangement 56. Here, as a result of the division of the guide section 64 into the first angular section 66 and the second angular section 68, the gear-shifting drum 30 can be moved for engaging and disengaging gear stages, without the parking-lock arrangement 40 being actuated into the locking position S. Via the guide section 64, the locking of the parking-lock pawl 48 in the release position F can even be achieved without separate locking means being necessary. If the gear-shifting drum 30 is moved in such a way that the driver 70 passes into the first angular section 66, the parking-lock arrangement 40 is actuated into the locking position S. It is possible here that a gear stage which is engaged in advance, such as a reverse gear stage or a first gear stage, remains engaged or else is disengaged in advance. As a result of the parallel orientation of the drive shaft 38 or the gear-shifting drum 30, the second axis 58 and the pawl axis 50, it is possible to realize the parking-lock arrangement 40 without any rotation/translation converters or translation/rotation converters. Accordingly, this results in a high degree of efficiency and a compact construction. In general, the overall solution is robust and has only a low level of complexity, as a result of which the costs of the parking-lock arrangement 40 are low.

The second angular section 68 is preferably greater than the first angular section 66 and is, in particular, greater than 180°, preferably greater than 250°. The second angular section 68 is preferably smaller than 360°, in particular smaller than 320°. The first angular section 66 is preferably greater than 5° and preferably smaller than 90°, in particular smaller than 45°.

In the following FIGS. 2 to 5, further embodiments of parking-lock arrangements are described which correspond to the parking-lock arrangement 40 of FIG. 1 with regard to construction and method of operation. Identical elements are therefore labelled by identical reference numbers. Essentially the differences will be explained in the following text.

Figure 2:
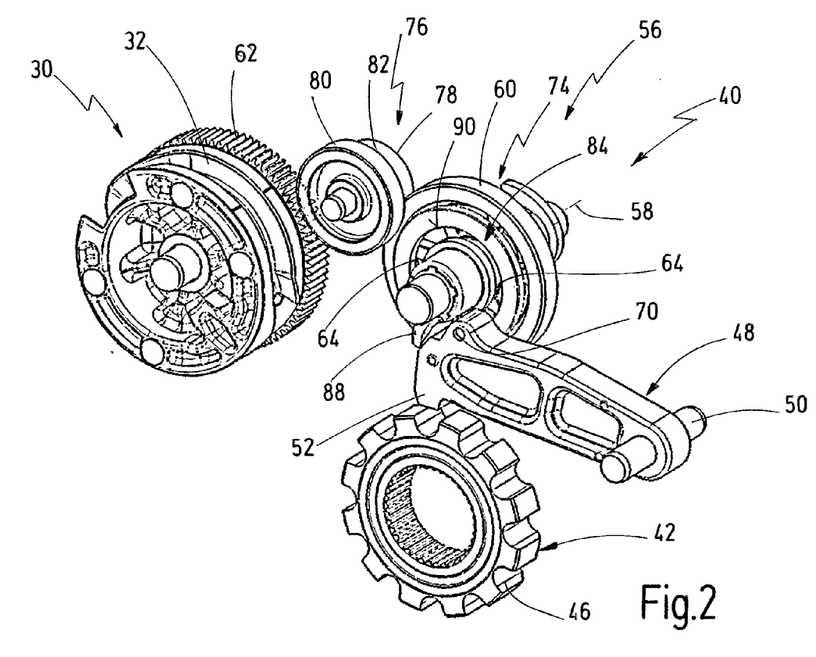
FIG. 2 shows a perspective view of a further embodiment of a parking-lock arrangement according to the invention from the front.
Figure 3:
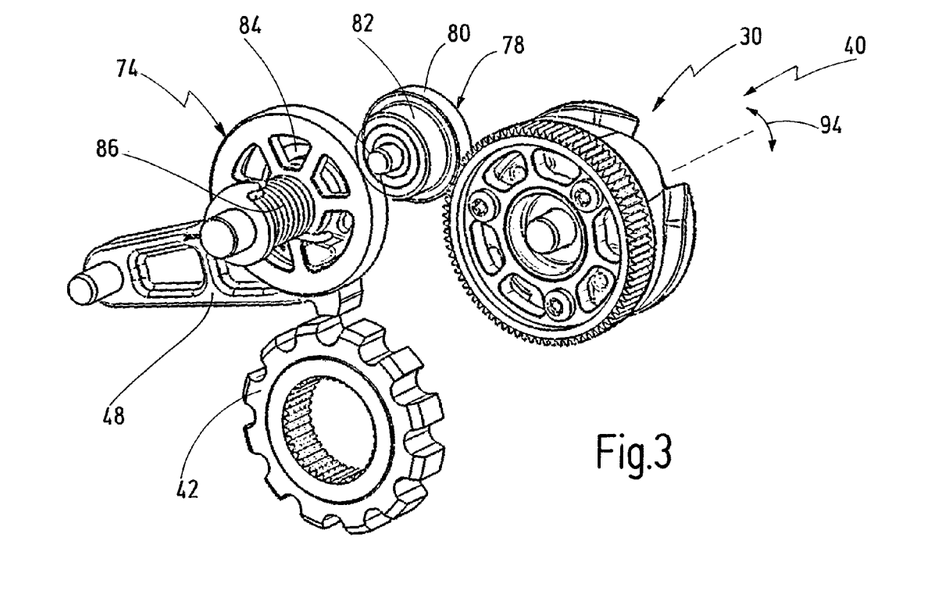
FIG. 3 shows the parking-lock arrangement from FIG. 2 in a perspective illustration from the rear.

In the parking-lock arrangement 40 which is shown in FIGS. 2 and 3, the actuating arrangement 56 has a carrier wheel 74, on the outer circumference of which the external toothing system 60 is formed. Furthermore, the carrier wheel 74 is coupled to the gear-shifting drum 30 via a wheel-set arrangement 76. The wheel-set arrangement 76 has an intermediate wheel 78 with a first toothing system 80 and a second toothing system 82. The first toothing system 80 is in engagement with the gear-shifting drum toothing system 62. The second toothing system 82 is in engagement with the external toothing system 60 of the carrier wheel 74. A high transmission ratio can be set by way of the wheel-set arrangement 76, with the result that the parking-lock arrangement can be actuated by way of small drive moments of the electric motor 36. For example, the torque which is applied by the electric motor 36 can be increased by means of the set transmission ratio to at least 20 times, in particular at least 50 times the moment for pulling the parking-lock pawl 48 out of the locking position S.

Furthermore, the actuating arrangement 56 has an actuating wheel 84 which is arranged coaxially with respect to the carrier wheel 74 and is mounted such that it can be rotated to a limited extent with respect to the latter. The actuating wheel 84 is coupled to the carrier wheel 74 via a torsion spring 86 (see FIG. 3). As a result, the carrier wheel 74 can be rotated into a position, in which the locking tooth lies above a tooth of the external toothing system 46 of the parking-lock wheel 42, the torsion spring 86 being stressed in this case, since the actuating wheel 84 cannot move with it here. As soon as the parking-lock wheel 42 is then moved further, the parking-lock pawl 48 is moved into the locking position S by means of the prestressing force of the torsion spring 86.

Furthermore, an actuating cam 88 is formed on the actuating wheel 84. The said actuating cam 88 acts on a longitudinal-side end face of the parking-lock pawl 48. FIG. 2 shows the actuating cam 88 in a position just before the first angular range 66, in which position the parking-lock pawl 48 is still situated in the release position F. Further rotation of the actuating cam 88 in the clockwise direction leads to pivoting of the parking-lock pawl 48 into the locking position S.

In this embodiment, the guide section 64 is likewise formed on the actuating wheel 84. The guide section 64 extends over an angular range of greater than 300°. Here, the guide section 64 has an axial recess in the manner of a groove, the outer circumferential section 90 of which acts on the driver 70, in order to pull the parking-lock pawl 48 from the locking position S into the release position F and to hold it in the release position F within the second angular section 68.

Furthermore, FIG. 3 diagrammatically shows that the parking-lock arrangement 40 can also optionally be emergency unlocked mechanically, to which end an emergency unlocking mechanism 94 is provided. The latter can be actuated from a point in the engine compartment. If the parking-lock arrangement 40 is also to have a function in the context of an immobilizer, it is preferred if an actuating member for actuating the emergency unlocking mechanism 94 is arranged in the interior of the motor vehicle.

Figure 4:
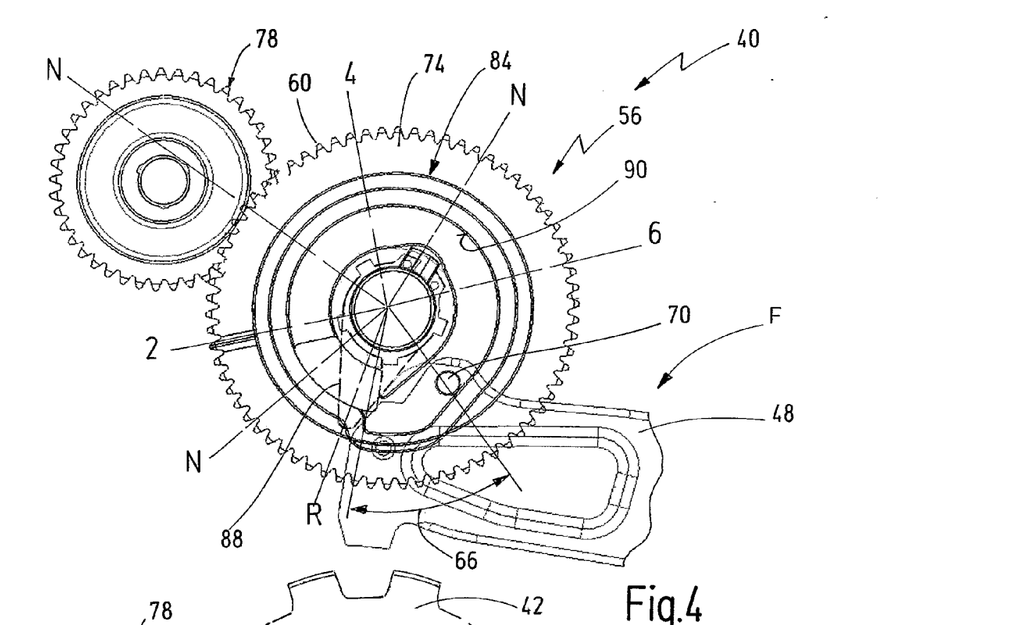
FIG. 4 shows a diagrammatic cross-sectional view through a further embodiment of a parking-lock arrangement according to the invention in a release position.
Figure 5:
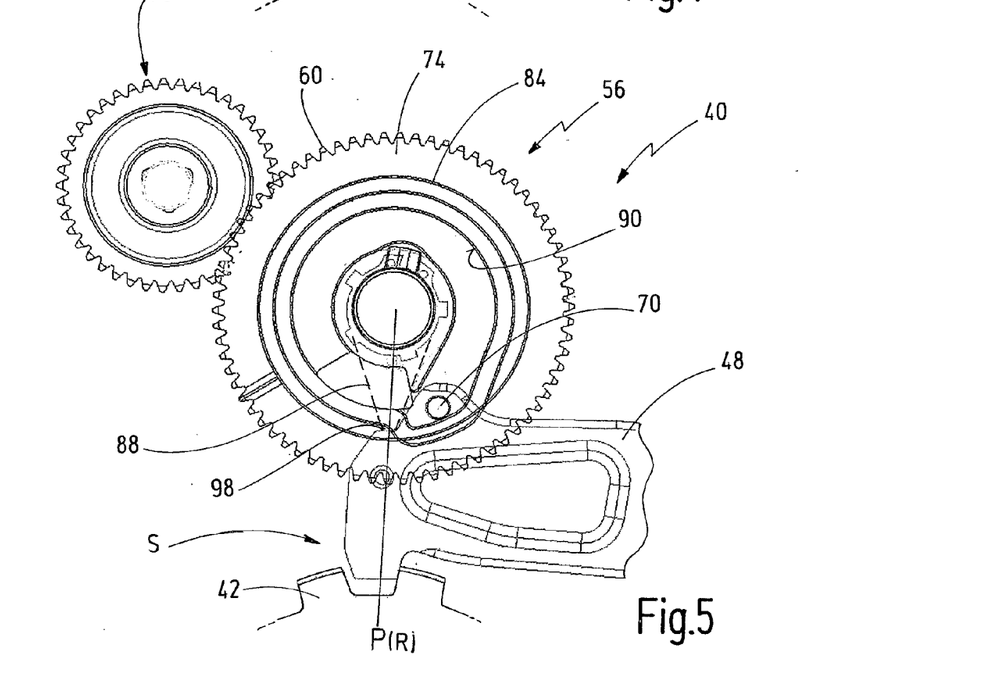
FIG. 5 shows the parking-lock arrangement from FIG. 4 in a locking position.

FIGS. 4 and 5 show a further embodiment of a parking-lock arrangement which generally corresponds to the parking-lock arrangement of FIGS. 2 and 3 with regard to construction and method of operation. Identical elements are therefore labelled by identical reference numerals.

Here, FIG. 4 shows the actuating cam 88 in a position just before the first angular section 66. In the present case, this position is assigned to a reverse gear stage R of the motor-vehicle transmission 16. In other words, the reverse gear is engaged in this position. A rotation of the gear-shifting drum 30 in such a way that the actuating wheel 84 is moved counter to the clockwise direction leads first of all to an engagement of a neutral stage, in which no gear stage is engaged. This is followed by a position for the gear stage 2. This is followed again by a neutral stage. This is followed by the gear stage 4. This is followed once again by a neutral position N. This is then followed by a rotational position for the gear stage 6. The range covered as a result within the second angular section 68 is greater than 180°. Within the first angular section 66, the parking-lock pawl 48 is pressed into the locking position S by means of the actuating cam 88, the actuating cam 88 resting on a shoulder 98 of the parking-lock pawl 48 in the locking position S which is shown in FIG. 5, with the result that a self-locking action for the locking position S is realized, in which no forces are to be applied by the electric motor 36. In order to release the parking-lock arrangement 40, the actuating cam 88 is then moved again counter to the clockwise direction in order to engage the reverse gear stage. Since, as a result, the release of the parking-lock arrangement 40 can be accompanied by an engagement of an adjacent gear stage, toothing systems and other parameters of a corresponding synchronizing device are configured in such a way that blocking when the said gear stage is engaged at a standstill can be prevented, in particular configured as pointed toothing systems on the selector sleeve and/or clutch body.

It goes without saying that a sliding coating can be provided on the outer circumferential section 90 of the guide section 64 and/or on an inner circumferential section thereof, in order to keep the frictional resistance low when the driver 70 is guided within the first and/or the second angular section 66, 68.

What is claimed is:

1. Parking-lock arrangement for a motor-vehicle transmission, having
a parking-lock wheel which is mounted such that it can be rotated about a first axis,
a parking-lock pawl which is mounted such that it can be moved between a locking position and a release position and
an actuating arrangement which actuates the parking-lock pawl and is mounted such that it can be rotated about a second axis over an angular range, wherein the actuating arrangement has a guide section which is arranged around the second axis and in which a driver is guided which is connected to the parking-lock pawl,
wherein the angular range has a first angular section, within which the parking-lock pawl can be actuated, and a second angular section, within which the parking-lock pawl is held in a position, wherein the parking-lock pawl is held by the rotatable actuating arrangement in the release position within the second angular section,
wherein the second angular section is greater than the first angular section and greater than 180 degrees,
wherein the second angular section is concentric to the second axis, so that the driver is not moved when the driver is guided in the second angular section,
wherein the actuating arrangement has a carrier wheel and an actuating wheel, the carrier wheel being driven and the guide section being formed on the actuating wheel, and
wherein the actuating wheel is arranged coaxially with respect to the carrier wheel and is coupled to the carrier wheel at least in one rotational direction via a torsion spring.

2. Parking-lock arrangement according to claim 1, wherein the parking-lock pawl can be moved via the guide section from the locking position into the release position.

3. Parking-lock arrangement according to claim 1, wherein the actuating arrangement has an actuating cam, by which the parking-lock pawl can be moved from the release position into the locking position.

4. Parking-lock arrangement according to claim 3, wherein the actuating cam is formed on the actuating wheel.

5. Parking-lock arrangement according to claim 1, wherein the actuating arrangement is driven by an electric motor, the drive shaft of which is oriented parallel to the second axis.

6. Parking-lock arrangement according to claim 5, wherein the drive shaft of the electric motor is connected to a gear-shifting drum for actuating at least one shifting element.

7. Parking-lock arrangement according to claim 6, wherein the actuating arrangement is connected to the gear-shifting drum via a wheel-set arrangement.

8. Parking-lock arrangement for a motor-vehicle transmission, having
a parking-lock wheel which is mounted such that it can be rotated about a first axis,
a parking-lock pawl which is mounted such that it can be moved between a locking position and a release position and
an actuating arrangement which actuates the parking-lock pawl and is mounted such that it can be rotated about a second axis over an angular range,
wherein the angular range has a first angular section, within which the parking-lock pawl can be actuated, and a second angular section, within which the parking-lock pawl is held in a position, wherein the second angular section is greater than the first angular section and greater than 180 degrees, wherein the actuating arrangement is driven by an electric motor, the drive shaft of which is oriented parallel to the second axis, wherein the first axis and the second axis are oriented parallel to one another, wherein the actuating arrangement has a guide section which is arranged around the second axis and in which a driver is guided, wherein the second angular section is concentric to the second axis, so that the driver is not moved when the driver is guided in the second angular section wherein the actuating arrangement has a carrier wheel and an actuating wheel, the carrier wheel being driven and the guide section being formed on the actuating wheel, and wherein the actuating wheel is arranged coaxially with respect to the carrier wheel and is coupled to the carrier wheel at least in one rotational direction via a torsion spring.

9. Parking-lock arrangement according to claim 8, wherein the drive shaft of the electric motor is connected to a gear-shifting drum for actuating at least one shifting element.

10. Parking-lock arrangement according to claim 9, wherein the actuating arrangement is connected to the gear-shifting drum via a wheel-set arrangement.

\* \* \* \* \*